United States Patent
King et al.

(10) Patent No.: US 12,469,338 B2
(45) Date of Patent: Nov. 11, 2025

(54) EMISSIONS DATA CALCULATION AND REPORTING

(71) Applicant: GreenIRR Inc., Westport, CT (US)

(72) Inventors: Celine M. King, Malvern, PA (US); Richard Hyman, Weston, CT (US); Wilson Alexei, Bridgeport, CT (US); John Sattari, Duarte, CA (US)

(73) Assignee: GreenIRR Inc., Westport, CT (US)

( * ) Notice: Subject to any disclaimer, the term of this patent is extended or adjusted under 35 U.S.C. 154(b) by 0 days.

(21) Appl. No.: 18/394,451

(22) Filed: Dec. 22, 2023

(65) Prior Publication Data

US 2024/0412566 A1 Dec. 12, 2024

Related U.S. Application Data

(60) Provisional application No. 63/472,475, filed on Jun. 12, 2023.

(51) Int. Cl.
G07C 5/00 (2006.01)
(52) U.S. Cl.
CPC .................................. *G07C 5/008* (2013.01)
(58) Field of Classification Search
None
See application file for complete search history.

(56) References Cited

U.S. PATENT DOCUMENTS

| | | |
|---|---|---|
| 9,361,271 B2 | 6/2016 | Mukhopadhyay et al. |
| 2004/0093264 A1 | 5/2004 | Shimizu |

(Continued)

FOREIGN PATENT DOCUMENTS

| | | |
|---|---|---|
| CA | 3065781 A1 | 6/2020 |
| CN | 105260836 A | 1/2016 |

(Continued)

OTHER PUBLICATIONS

Transporeon GMBH, Carbon Visibility, https://www.transporeon.com/en/platform/sustainability-hub/carbon-visibility, 2024, 5 pages.

(Continued)

*Primary Examiner* — Hitesh Patel
*Assistant Examiner* — Wenyuan Yang
(74) *Attorney, Agent, or Firm* — Sunstein LLP

(57) ABSTRACT

A method for monitoring emissions of vehicles includes receiving vehicle telematics data and fuel purchase data for the vehicles. The method includes formatting the telematics data and the fuel purchase data according to a data structure schema and storing the telematics data and the fuel purchase data in a data structure. The method includes determining if the telematics data or the fuel purchase data contains sufficient information to determine an amount of emissions generated by the vehicle(s) over a period of time and in response to determining that one of the vehicle telematics data or the fuel purchase data does not contain sufficient information to determine the emissions generated by the vehicle(s) over a particular period of time, utilizing, at least a portion of the other of the vehicle telematics data or the fuel purchase data to determine the emissions generated by the vehicle(s) over a particular period of time.

20 Claims, 11 Drawing Sheets

(56) References Cited

U.S. PATENT DOCUMENTS

| | | | |
|---|---|---|---|
| 2008/0040182 A1* | 2/2008 | Wegner | G06Q 10/08 705/7.26 |
| 2009/0069999 A1* | 3/2009 | Bos | G07C 5/008 701/33.4 |
| 2011/0184784 A1 | 7/2011 | Rudow et al. | |
| 2011/0208621 A1* | 8/2011 | Feierstein | G06Q 40/04 705/317 |
| 2012/0173132 A1 | 7/2012 | Lin et al. | |
| 2012/0209579 A1 | 8/2012 | Fansler et al. | |
| 2017/0151917 A1* | 6/2017 | Bradley | G01F 9/001 |
| 2019/0102509 A1 | 4/2019 | Thibault et al. | |
| 2020/0064318 A1 | 2/2020 | Keni | |
| 2020/0242858 A1 | 7/2020 | Meroux et al. | |
| 2020/0294330 A1* | 9/2020 | Vigild | G07C 5/085 |
| 2023/0020291 A1* | 1/2023 | Sanchez | G06T 11/00 |
| 2023/0243663 A1* | 8/2023 | Beentjes | G06Q 40/08 701/123 |
| 2024/0242545 A1* | 7/2024 | Salako | G07C 5/0825 |

FOREIGN PATENT DOCUMENTS

| | | |
|---|---|---|
| DE | 10055059 A1 | 5/2002 |
| KR | 20140096211 A | 8/2014 |
| WO | 2006/099427 A2 | 9/2006 |
| WO | 2012/174494 A1 | 12/2012 |

OTHER PUBLICATIONS

Emitwise, https://emitwise.com/solutions/corporate-carbon-footprinting, 6 pages.

European Patent Office/ISA, International Search Report and Written Opinion of the International Searching Authority, Application No. PCT/US2024/032408, mailed Sep. 30, 2024, 12 pages.

Teletrac, "How to measure fuel consumption—Teletrac Navman US," Mar. 22, 2023, 4 pages, XP093201500; https://web.archive.org/web/20230322053504/https://www.teletracnavman.com/fleet-management-softwarae/resources/how-to-measure-fuel-consumption.

* cited by examiner

EMISSIONS DATA CALCULATION AND REPORTING

CROSS-REFERENCE TO RELATED APPLICATIONS

This application claims the benefit of U.S. Provisional Application No. 63/472,475, filed Jun. 12, 2023, entitled "System and Methodology for Environmental Emissions," the entire contents of which is hereby incorporated herein by reference.

TECHNICAL FIELD

The present invention relates to monitoring greenhouse gas emissions, and more particularly to monitoring emissions of transportation companies such as trucking fleets.

BACKGROUND

Many environmentally impactful industries, such as the trucking industry, are increasingly being requested to provide greenhouse gas emissions data and disclosures by customers and stakeholders due to regulatory, industry, and market pressures related to emissions reporting. Trucking carriers and/or fleet managers are often unable to provide such disclosures due to a lack of emissions accounting technology, expertise, and resources to produce this information. These companies can benefit from an automated emissions monitoring system with access to accurate and reliable data.

SUMMARY

In one aspect, the disclosure features a method for monitoring emissions for one or more vehicles. The method includes receiving vehicle telematics data for the one or more vehicles and receiving fuel purchase data for the one or more vehicles. Then the vehicle telematics data and the fuel purchase data are formatted in alignment with a data structure schema, and stored in a data structure. The method further includes determining whether one of the vehicle telematics data or the fuel purchase data contains sufficient information to determine an amount of emissions generated by the vehicle(s) over a particular period of time. Then, in response to determining that one of the vehicle telematics data or the fuel purchase data does not contain sufficient information to determine the emissions generated by the vehicle(s) over a particular period of time, utilizing, at least a portion of the other of the vehicle telematics data or the fuel purchase data to determine the emissions generated by the vehicle(s) over a particular period of time.

In other aspects of the disclosure, one or more of the following features may be included. The vehicle telematics data may comprise one or more of the data elements: distance traveled; odometer reading; idle time; and fuel consumption; and the fuel purchase data comprises one or more of the data elements: fuel purchase amount; fuel type; fuel cost; location of purchase; mileage; and date of purchase. In a related aspect, the method may further comprise determining whether the distance traveled data element contains more than a threshold number of null values and, if so, completing an action selected from: substituting distance traveled data values with odometer reading data values; substituting distance traveled data values with mileage data values; or removing the distance data element from utilization in determining the emissions generated by the vehicle(s). In another related aspect, the method may further comprise determining whether the fuel consumption data element contains more than a threshold number of null values and, if so, completing an action selected from: substituting fuel consumption data values with fuel purchase amount data values; or imputing fuel consumption data values in place of the null values.

In other aspects of the disclosure, the vehicle telematics data and the fuel purchase data may each come from either a fleet management system or a fuel card system. In another aspect, the method may further comprise generating an emissions forecast based at least in part on a trend derived from historical data of vehicle emissions. In another aspect, the method may comprise calculating scope 1, scope 2, and scope 3 emissions associated with the one or more vehicles. In another aspect, determining the emissions generated by the vehicle(s) over a particular period of time may include determining quantities of a plurality of different greenhouse gases emitted. Also in another aspect, determining the emissions generated the by vehicle(s) over a particular period of time may include allocating emissions to at least one of: one or more shippers; and one or more shipments. In another aspect, the method may further comprise generating an emissions reduction recommendation based on at least one of the vehicle telematics data, the fuel purchase data, and the emissions generated by the vehicle(s) over a particular period of time.

According to another aspect, a computer system may be configured to perform the one or more of methods described above.

According to an aspect of the disclosure, a method for providing accurate and reliable emissions monitoring comprises receiving vehicle telematics data for one or more vehicles and receiving fuel purchase data for the vehicle(s). Then formatting the vehicle telematics data and the fuel purchase data in alignment with a data structure schema, storing the vehicle telematics data and the fuel purchase data in a data structure and assessing the vehicle telematics data and the fuel purchase data for null values. The method then includes determining whether to utilize the vehicle telematics data, the fuel purchase data, or both, based at least in part on the assessment of null values, to calculate emissions generated by the vehicle(s) within a timeframe, and calculating emissions generated by the vehicle(s) within the timeframe. In an aspect, a computer system may be configured to perform this method.

BRIEF DESCRIPTION OF THE DRAWINGS

The foregoing features of embodiments will be more readily understood by reference to the following detailed description, taken with reference to the accompanying drawings, in which.

DETAILED DESCRIPTION

Figure 1:
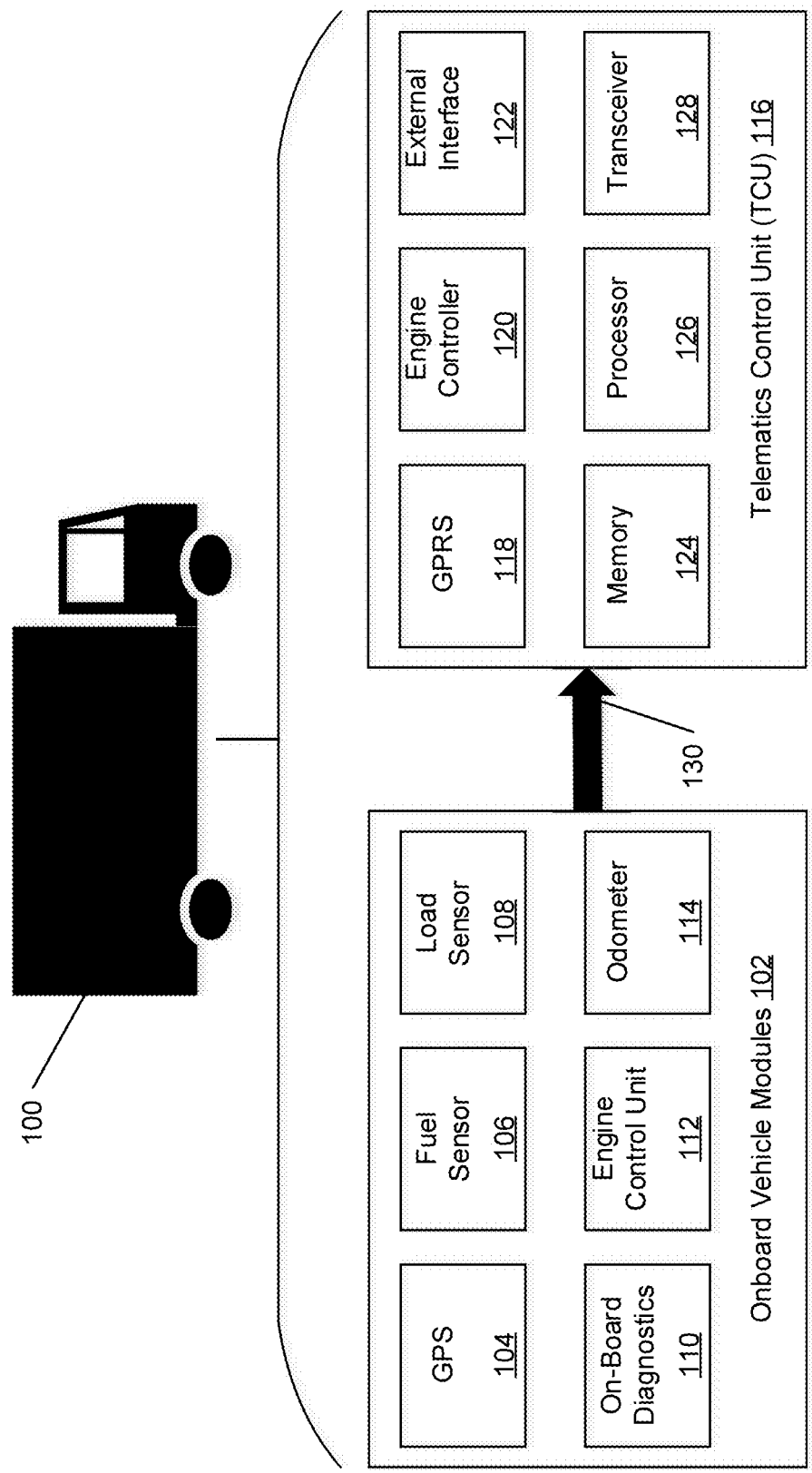
FIG. 1 is a diagram of onboard vehicle modules and a telematics control unit.

Systems (and methods used thereby) are described herein that are capable of receiving data from disparate sources (e.g., a vehicle telematics system and a fuel card system), and extracting, parsing, cleaning, transforming, processing, and storing the data, as well as calculating emissions generated by a source (e.g., a truck or a fleet of trucks) and generating emissions reports and forecasts based on the data and calculated emissions. The systems may provide the data, calculated emissions, emissions reports, emissions forecasts, and other information, to a user, e.g., through a user portal that communicates with a system API. The systems may enable users (e.g., trucking fleet managers) to accurately and conveniently monitor their past, present, and expected future greenhouse gas (GHG) (or other pollutants) emissions (including scope 1, 2, and 3 emissions) and provide that emissions data to environmental regulators, upstream shippers, and other stakeholders, and/or to make equipment, process, or personnel changes to reduce their emissions output.

In an example, a system may receive data from a vehicle's telematics control unit (TCU), such as fuel consumption data, distance traveled data, idle time data, etc. The system may also receive data from a fuel card system, which tracks fuel purchases associated with a particular user or group of users. The system may process and organize this data, and use it to calculate emissions from the vehicle generated over a period of time. As part of processing, the system may analyze both the data coming from the TCU and the data coming from the fuel card system for completeness and reliability, including identifying null values and errors. After analyzing the data, the system may discard erroneous values, and may discard null values or substitute or impute values in their place. Depending on data availability, completeness, reliability, and other factors, the system may choose to use either the TCU data, the fuel card data, or both, to calculate the emissions from the vehicle. The system may also cross-validate the TCU data with the fuel card data. The system may also analyze and process the calculated emissions in order to, for example, identify trends, predict future emissions, identify potential emissions reduction options, calculate the cost of emissions, allocate emissions to specific trips, loads, or shippers, generate other insights, and generate reports for a user.

Within this application and the included claims, the phrases "period of time" and "timeframe" encompass both past and present (i.e., real-time).

Some additional information may be found in the following references, the entireties of which are hereby incorporated by reference:

Cho et al. *International Journal of Automotive Technology*, Vol. 7, No. 4, pp. 509-517 (2006).
Cassias and Kun, "Vehicle telematics: A literature review," *Univ. New Hampshire, Durham, NH, USA, ECE. P* 54 (2007).
McDonnell et al. *Sensors* 21(10):3517 (2021).
Chen and Chien, *Journal of Computer and Communications*, 3, 153-158 (2015).
*What is telematics?*, Embitel, IoT Insights.
MARTIN KLEPPMAN, DESIGNING DATA-INTENSIVE APPLICATIONS: THE BIG IDEAS BEHIND RELIABLE, SCALABLE, AND MAINTAINABLE SYSTEMS, 1st ed. 2017.

FIG. 1 shows an example of a vehicle 100, which comprises a number of onboard vehicle modules 102 and a Telematics Control Unit (TCU) 116. The vehicle 100 may be a truck, car, van, motorcycle, train, airplane, helicopter, or other type of machine capable of transport. The onboard vehicle modules 102 may comprise, for example, a GPS (or other GNSS) unit 104, a fuel sensor 106, a load sensor 108, an on-board diagnostics module 110, an engine control unit 112, and an odometer 114. The onboard vehicle modules 102 may, among other functions, collect data pertaining to the vehicle's operation, including, for example, distance traveled, odometer reading, freight transported, idle time (including short idle time, inter-trip idle time, and parked idle time), fuel consumption, fuel level, MPG (and/or MPGEUS [Miles Per Gallon electric Equivalent]), Kilowatt Hours, and the Vehicle ID. There may be more, fewer, or different onboard vehicle modules 102.

The TCU 116 manages the collection and transmission of vehicle information (e.g., data collected by the onboard vehicle modules 102). The TCU 116 may receive data from the onboard vehicle modules 102 through a communication mode 130, such as a Controller Area Network (CAN) bus. The TCU 116 may comprise a number of modules including, for example, a General Packet Radio Service (GPRS) communications module 118, an engine controller 120, an external interface 122, a memory 124, a processor 126, and a transceiver 128. A GPS (or other GNSS) unit may be included in the TCU 116 instead of, or in addition to, an onboard vehicle GPS unit 104. The GPRS communications module 118 may enable data connectivity to remote devices over a wireless or cellular network or satellite. The GPS unit 104 may communicate with satellites using the GPRS communications module 118 or via another known means. The engine controller 120 may receive data from and issue instructions to the engine control unit 112. The external interface 122 may enable the TCU 116 to receive instructions (e.g. through a physical user interface such as a display, buttons and/or a touch screen, or through instructions received by wire or wirelessly) or to display data or send data to external devices, such as computers, mobile devices, servers, databases, etc. The TCU 116 may comprise physical hardware components such as memory 124 (which may be volatile memory and/or non-volatile memory), a processor 126 (which may include one or more processors), and a transceiver 128, which may enable the TCU 116 to send and receive data. There may be more, fewer, or different modules and hardware components within the TCU 116. In addition to hardware components, the TCU may host a range of software including bootloader software, Real Time Operating System (RTOS), GNSS, fleet management, and/or device management (FOTA) software.

Figure 2:
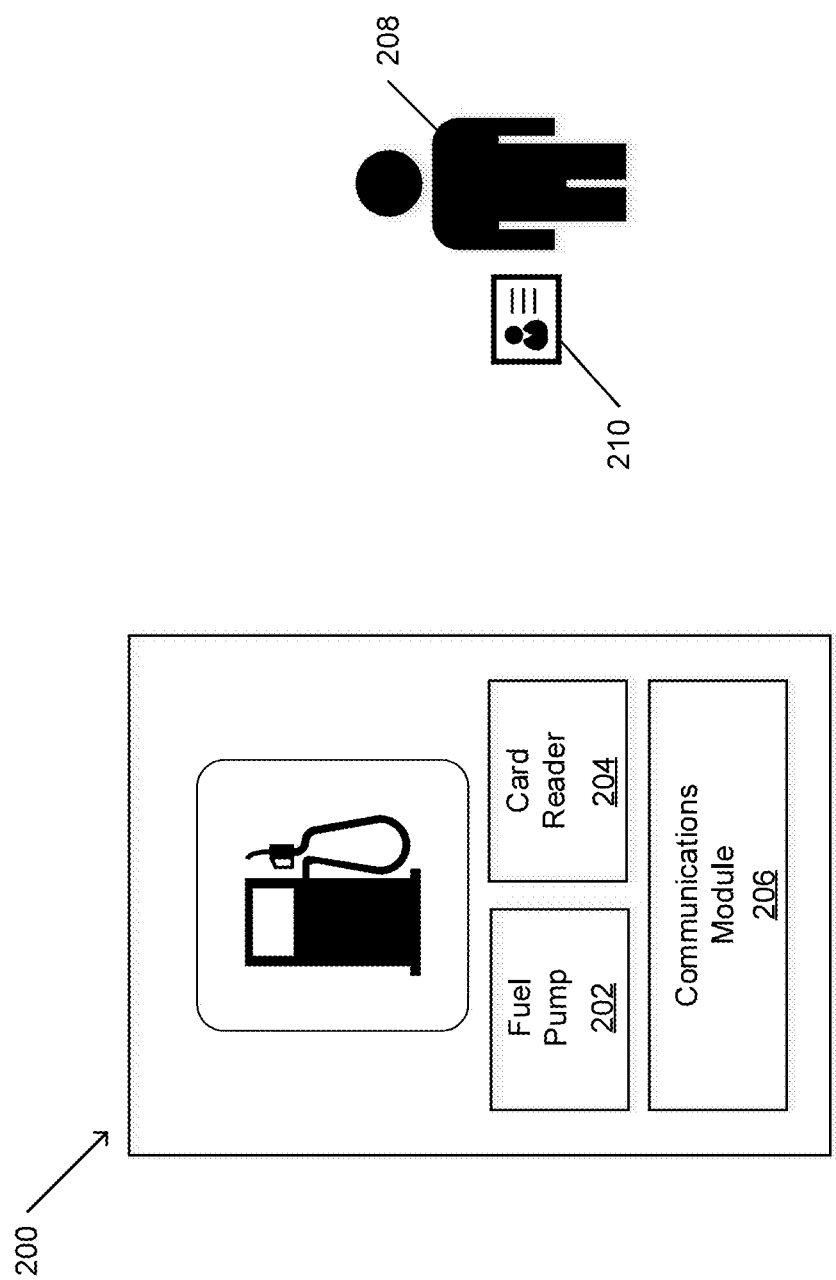
FIG. 2 is a diagram of a fuel card system.

FIG. 2 shows an example of a Fuel Card System (FCS) 200. The FCS 200 may typically comprise a fuel pump 202, which delivers fuel (gasoline, diesel, electric power, etc.) to the vehicle 100, a card reader 204, and a communications module 206. The vehicle driver 208 will utilize a fuel card 210, (which may be a credit card, debit card, or other method of payment, such as a smartphone with NFC, and which may be associated with a user, a vehicle, a group of users, a group of vehicles, a user and a vehicle, a group of users and a group of vehicles, a fleet, a company, etc.) to purchase fuel. The vehicle driver 208 will, e.g., swipe, insert, or tap the fuel card 210 at the FCS 200 through the card reader 204. The card 210 will be authenticated by the card reader 204, which collects and exchanges information regarding the transaction. The card reader 204 may decode the card's information and encrypt it for transmission via the communications module 206. The communications module may send the card's information and the transaction information to a payment processor, which may further communicate with the cardholder's bank or credit agency for verification. The communications module 206 may receive the verification and send it to the card reader 204 for display to the driver 208.

The driver 208 may be required to enter a unique code, e.g. into the card reader 204 or into a mobile application, to identify the vehicle 100. The driver 208 may be required to enter the vehicle 100's odometer value at the time of purchase. The unique code and/or vehicle odometer value may, along with transaction data collected by the card reader 204, such as fuel type, fuel cost, fuel quantity purchased, driver 208 ID, vehicle 100 ID, carrier ID, date+time, location of purchase, etc., be transmitted by the communications module 206 over a wireless or wired communication network to a server belonging to the provider of the fuel card 210. The provider of the fuel card may make this data accessible through, e.g., an API (Application Programming Interface).

Figure 3:
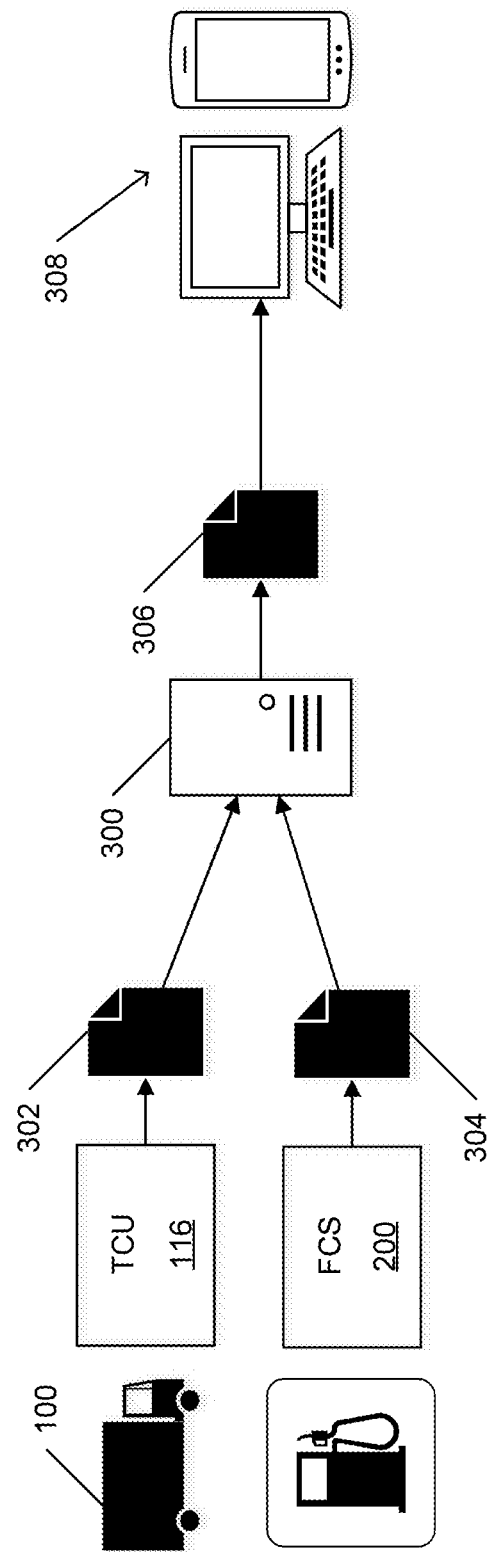
FIG. 3 is an overall data flow diagram.

FIG. 3 shows a simplified overview of an emissions data flow, including an emissions calculation and prediction system 300 (hereinafter "the system"). The TCU 116 of vehicle 100 may output vehicle information 302 collected by the onboard vehicle modules 102. Vehicle information 302 may comprise data pertaining to the vehicle's operation, including, for example, distance traveled, odometer reading, freight transported, idle time (including short idle time, inter-trip idle time, and parked idle time), fuel consumption, fuel level, MPG (and/or MPGEUS), Kilowatt Hours, and the Vehicle ID. The vehicle information 302 is then received by the system 300. The Fuel Card System 200 may output fuel purchase information 304 associated with the vehicle 100, including, for example, fuel quantity, fuel type (gasoline, diesel, electric power, octane rating, etc.), fuel price, date and time of purchase, fuel card ID, vehicle ID, and odometer reading at time of purchase. The fuel purchase information 304 is then received by the system 300.

The system 300 may then ingest, parse, process, and store the vehicle information 302 and the fuel purchase information 304. The system 300 may use the information 302 and/or 304 to calculate emissions created by the operation of the vehicle 100 (or otherwise associated with the vehicle 100). The system 300 may also generate predicted future emissions, emissions trends, emissions reduction recommendations, emissions reports, and other insights based upon the vehicle information 302 and/or the fuel purchase information 304. The calculated emissions and generated insights may collectively be referred to as output data 306. The output data 306 may be received by a user device 308 (such as a computer, mobile device, server, etc.). For example, the user device 308 may request the data from the system 300 through an API.

Figure 4:
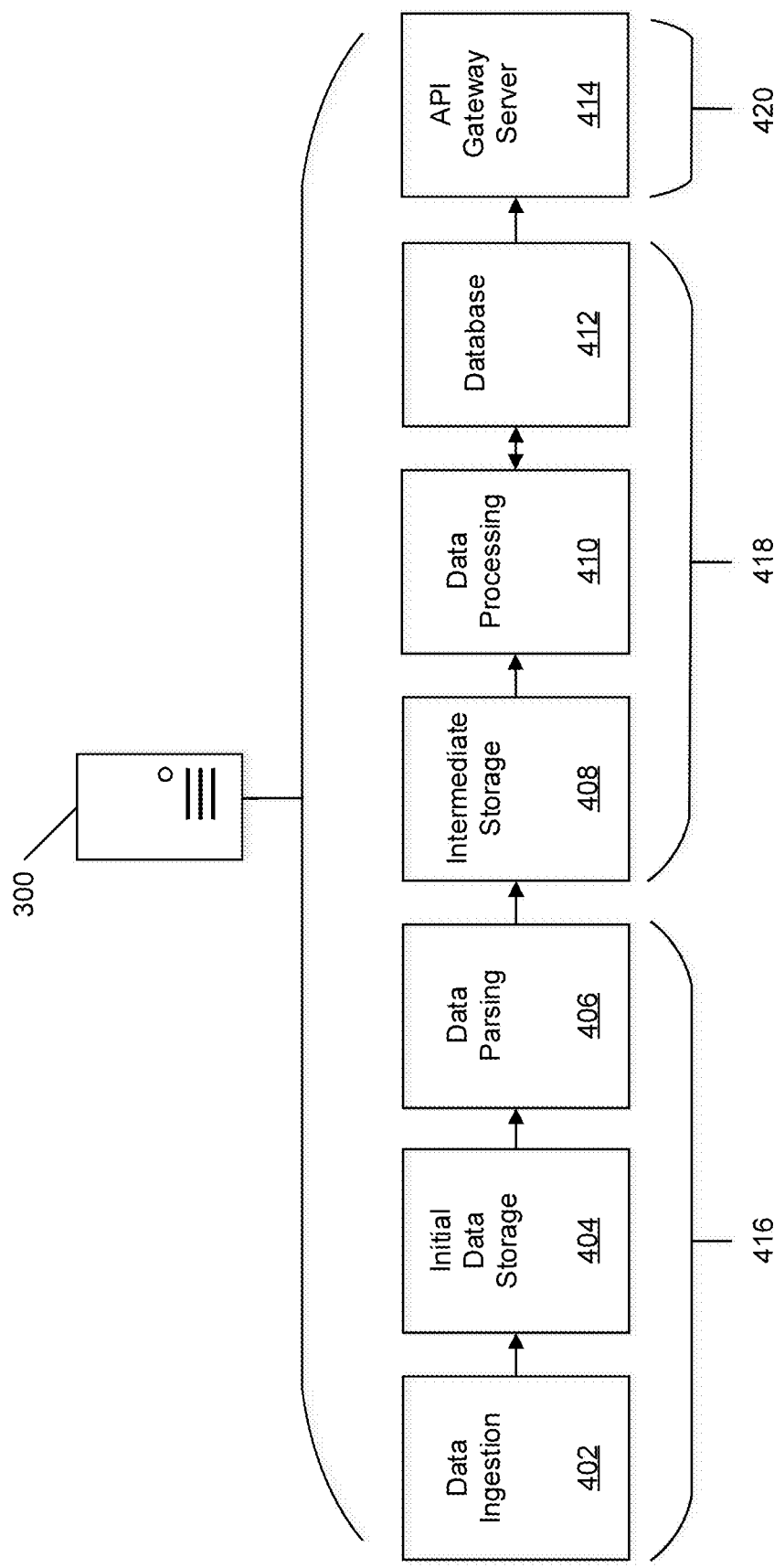
FIG. 4 is a data flow diagram within an emissions calculation and prediction system.

FIG. 4 shows a diagram of a data flow 400 that occurs within the system 300. The data flow 400 may comprise three main layers-extraction layer 416, storage & processing layer 418, and API layer 420. The extraction layer may comprise the data ingestion stage 402, the initial data storage stage 404, and the data parsing stage 406. The storage and processing layer 418 may comprise the intermediate storage stage 408, the data processing stage 410, and the database stage 412. The API layer may comprise the API gateway server stage 414.

At data ingestion stage 402, the system receives data, such as the vehicle information 302 and/or the fuel purchase information 304. The system may receive data from external API's or data stores from data providers such as fleet management systems like EFS, Omnitracs, Geotab, VerizonConnect etc. For example, a Fuel Card System provider may provide access to an API, from which the system 300 can request the fuel purchase information 304, and a telematics provider may provide access to an API, from which the system 300 can request the vehicle information 302. The information may be specific to a vehicle 100, a driver 208, a fleet of vehicles, a group of drivers, an entire company, a group of companies, etc., and may be associated with one or more unique ID's, and may have parent-child associations, such as emissions associated with a vehicle, which is associated with a fleet, which is associated with a company. The information may also be received via other means. During the data ingestion stage 402, each data source (e.g., external API or similar) may have an associated integration based upon the characteristics of the data source. These integrations may, for example, be housed within a server, such as an AWS (Amazon Web Services) EC2 (Elastic Compute Cloud) instance, and may function to extract data from the data source, format the extracted data into an acceptable format for the initial data storage 404, and send the extracted data to the initial data storage 404.

The initial data storage 404 may be any type of data structure including, for example, a queue, and in particular, an internal messaging queue. The initial data storage 404 may store data that has been ingested at stage 402 in an organized manner, such as messages in the internal messaging queue, to prepare the data for data parsing at stage 406. During the data parsing stage 406, the initially stored data is parsed and formatted, for example, into individual JSON files in alignment with a desired schema. and then sent to intermediate storage 408. The intermediate storage 408 may be any data structure including, for example, Amazon S3 (Simple Storage Service) buckets. At the intermediate storage stage 408, the data may be programmatically organized (such as by AWS Glue Jobs, e.g., into a folder structure based on 'tablename', 'custom_identifier' [e.g., vehicle ID, fleet ID, customer ID, etc.], 'year', 'month', 'date,) and may be stored prior to further processing at stage 410. The data may be encrypted, with access to certain data limited to appropriately credentialed users.

At the data processing stage 410, the system 300 may perform a variety of functions including, for example, data type transformation, data cleaning, data acceptance, unit conversion, emissions calculation, emissions forecasting, emissions analysis, recommendation generation, allocation of emissions to particular loads, shippers, and/or geographical regions, and report generation. These functions will be described in more detail further throughout this specification and specifically in reference to FIGS. 6 and 7. After the data processing stage 410, the processed data (and optionally the raw pre-processed data) may be stored in the database 412. The database 412 may comprise an Amazon Relational Database Service (RDS) or other known method of storing data. The database 412 may additionally include secondary storage for backend access and monitoring, such as Amazon Athena, which may help avoid database request backlogs when data is being accessed by both a customer and someone other than a customer (such as a backend developer).

As shown by the double-sided arrow between stages 410 and 412, data within the database 412 may also be accessed for further data processing 410 if such processing is needed. The further processed data may then be stored in the database 412. For example, data from the TCU 116, the FCS 200, or both, may be cleaned and accepted (see FIG. 6 for more detail), and the cleaned and accepted data may be stored in a table within database 412. Then, at a later point, the cleaned and accepted data may be pulled from database 412 back into data processing 410, wherein emission calculation 618 is performed by the system 300. The output of emission calculation 618 may then be stored in a different table (or tables, or other data structures and file types) within database 412.

Data, at any or all points during data flow 400 may be associated with a Telematics ID, or a Fuel Card ID, and/or a Vehicle ID, and/or a Customer ID. The Telematics ID may be a unique identifier for the telematics data provider. The Fuel Card ID may be a unique identifier for the fuel card data provider. The Vehicle ID may be a unique identifier that associates data with a particular vehicle 100. The Customer ID may be a unique identifier given to a customer when they subscribe to receive the services of the system 300, and the Customer ID may, for example, identify data from vehicles 100 within a fleet owned by the customer, or drivers 208 employed by the customer. These ID's enable data organization and tracking, so that data is not inadvertently mixed up, and so that analysis can be accurately performed.

At the next stage, the data may be requested from the database 412 by the API gateway server 414. The API gateway server may function to receive data access requests, over a network, by customers using user devices 308. The API gateway server may receive customer requests, make queries to the database 412 in response to the customer requests, and perform transformations to put the queried data into a presentable format for the frontend to display on the customer devices 308, wherein this formatted queried data may be the output data 306. Non-limiting examples of formatted output data 306 are shown in FIGS. 8-11.

Figure 5:
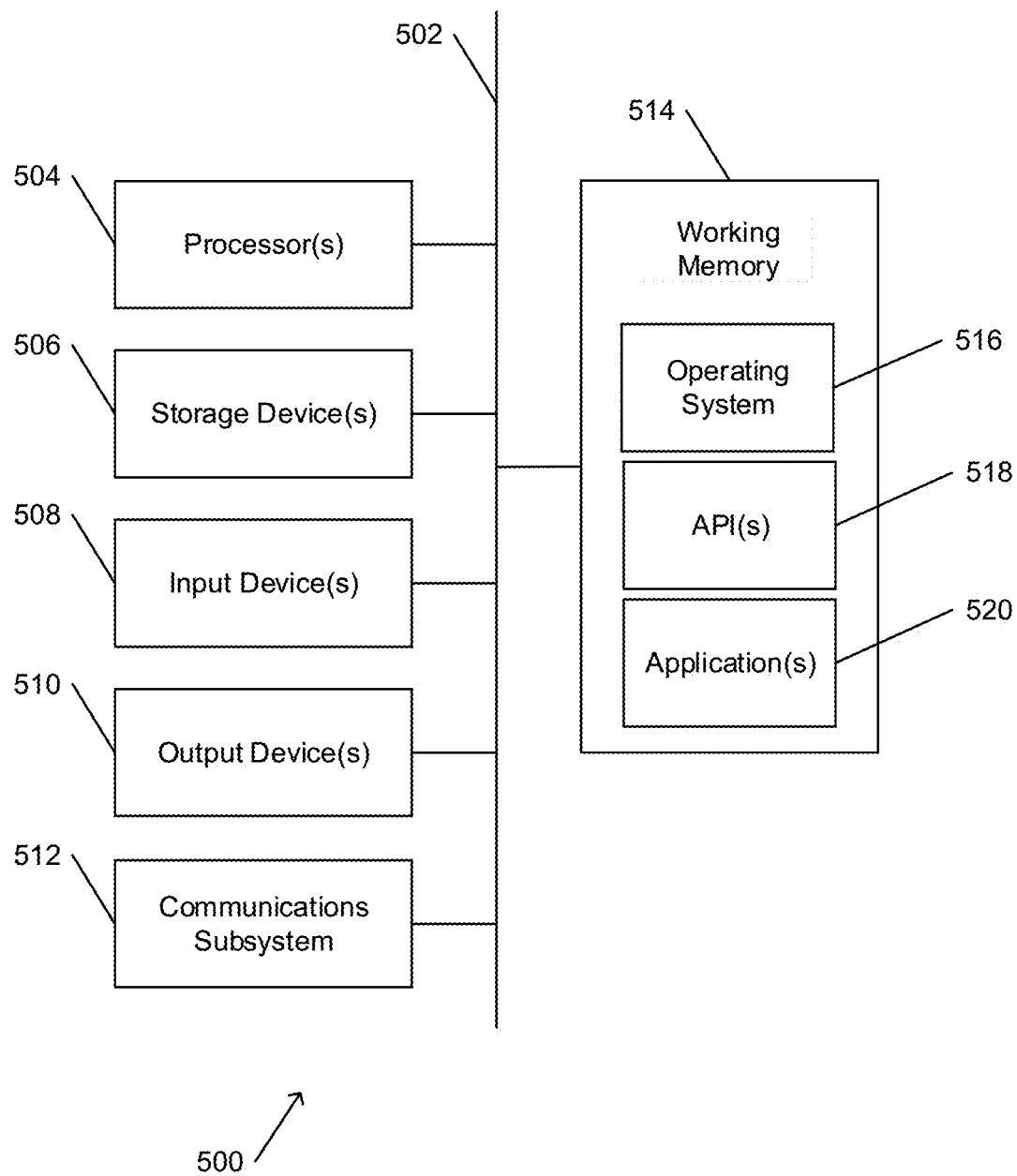
FIG. 5 is an example of a hardware diagram of an emissions calculation and prediction system.

Referring to FIG. 5, an example computer system 500 is shown. The computer system 500 as illustrated in FIG. 5 may incorporate as part of the previously described computer devices, including the system 300. FIG. 5 provides a schematic illustration of one embodiment of the computer system 500 that can perform the methods provided by various other embodiments, as described herein, and/or can function as the host computer system, or other networked computer system. In an example, the computer system 500 may be included in a cloud environment such as the Amazon AWS platform and the operations and function described herein may be distributed over different computer systems 500 operating in different locations. It should be noted that FIG. 5 is meant only to provide a generalized illustration of various components, and or all of which may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 502 (or may otherwise be in communication, as appropriate). In an example, the bus 502 may be configured as one or more communication channels in a cloud-computing environment. The hardware elements may include one or more processors 504, including without limitation one or more general-purpose processors and/or one or more special-purpose processors (such as digital signal processing chips, graphics acceleration processors, and/or the like); one or more input devices 508, which can include without limitation a mouse, a keyboard, a touchscreen and/or the like; and one or more output devices 510, which can include without limitation a display device, a printer and/or the like.

The computer system 500 may further include (and/or be in communication with) one or more non-transitory storage devices 506, which can comprise, without limitation, local and/or network accessible storage, and/or can included, without limitation, a disk drive, a drive array, an optical storage device, solid-state storage device such as random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 500 might also include a communications subsystem 512, which can include without limitation a modem, a network card (wireless or wired), an infrared communication device, a wireless communication device and/or chipset (such as a Bluetooth® device, an 802.11 device, a WiFi device, a WiMax device, cellular communication facilities, etc.), and/or the like. The communications subsystem 512 may permit data to be exchanged with a network (such as the network described below, to name one example), other computer systems, and/or any other devices described herein. In many embodiments, the computer system 500 will further comprise a working memory 514, which can include a RAM or ROM device, as described above.

The computer system 500 also can comprise software elements, shown as being currently located within the working memory 514, including an operating system 516, device drivers, executable libraries, and/or other code, such as one or more application programs 520, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods. In a cloud computing implementation, the working memory may include one or more application programming interfaces (APIs) 518 configured to send and receive data and instructions to and from other networked stations. For example, the API(s) 518 may be an example of an API on an API gateway server 414.

A set of these instructions and/or code might be stored on a computer-readable storage medium, such as the storage device(s) 506 described above. In some cases, the storage medium might be incorporated within a computer system, such as the computer system 500. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 500) to perform methods in accordance with various embodiments of the disclosure. According to a set of embodiments, some or all of the procedures of such methods are performed by the computer system 500 in response to processor 504 executing one or more sequences of one or more instructions (which might be incorporated into the operating system 516 and/or other code, such as an application program 520) contained in the working memory 514. Such instructions may be read into the working memory 514 from another computer-readable medium, such as one or more of the storage device(s) 506. Merely by way of example, execution of the sequences of instructions contained in the working memory 514 might cause the processor(s) 504 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 500, various computer-readable media might be involved in providing instructions/code to processor(s) 504 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 506. Volatile media include, without limitation, dynamic memory, such as the working memory 514. Transmission media include, without limitation, coaxial cables, copper wire and fiber optics, including the wires that comprise the bus 502, as well as the various components of the communication subsystem 512 (and/or the media by which the communications subsystem 512 provides communication with other devices).

Various forms of computer-readable media may be involved in carrying one or more sequences of one or more instructions to the processor(s) 504 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 500.

The communications subsystem 512 (and/or components thereof) generally will receive the signals, and the bus 502 then might carry the signals (and/or the data, instructions, etc. carried by the signals) to the working memory 514, from which the processor(s) 504 retrieves and executes the instructions. The instructions received by the working memory 514 may optionally be stored on a storage device 506 either before or after execution by the processor(s) 502.

Figure 6:
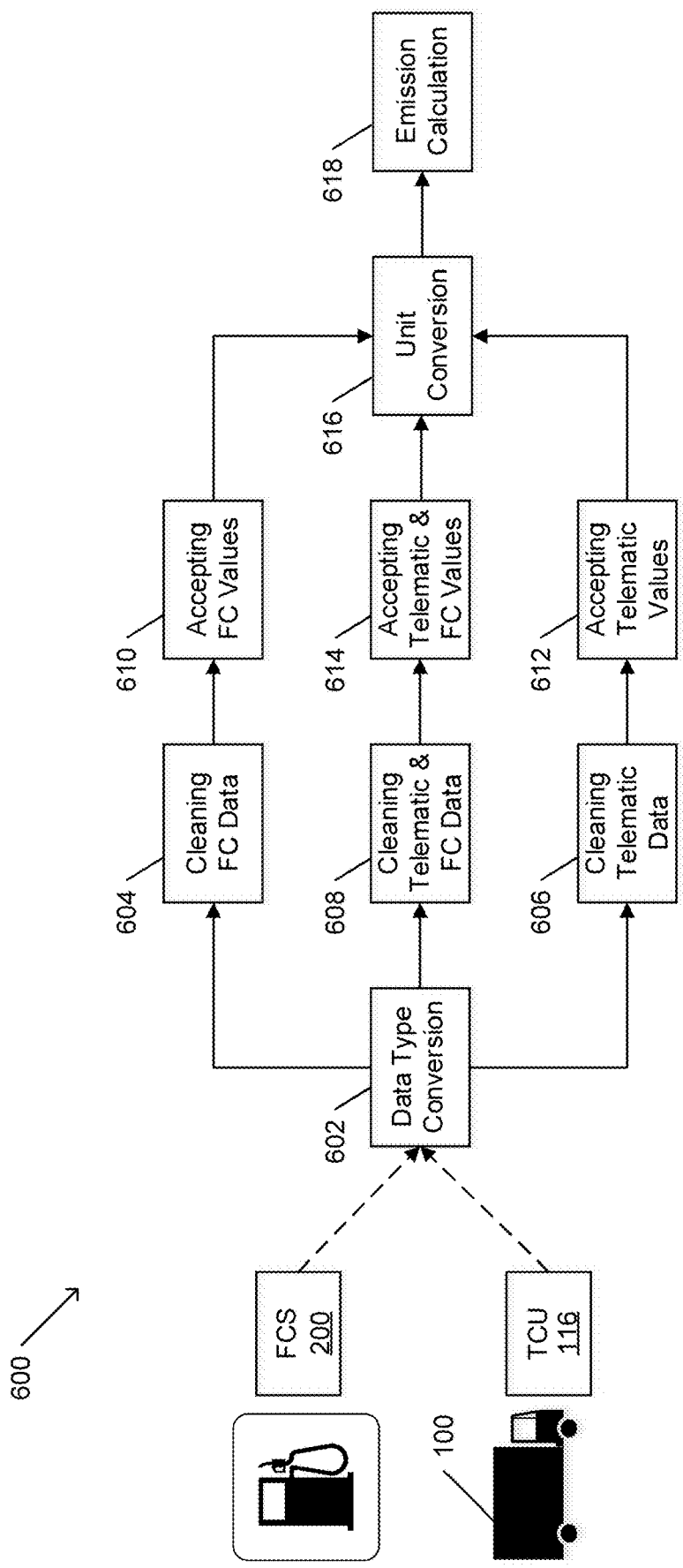
FIG. 6 is an example of a data acceptance methodology.

FIG. 6 shows an example of a data acceptance methodology, which may be used by the system 300 within, for example, the extraction layer 416 and the storage & processing layer 418. As already explained, data may originate from a Fuel Card System ("fuel card data"), and/or a vehicle 100's TCU 116 ("telematic data"). The system 300 may determine, prior to stage 602, whether the current set of data associated with a user/customer contains telematic data, fuel card data, both, or neither. The system 300 may generate an error message to output to user devices 308 if the user devices make a request for data that is unavailable. Both or either of the fuel card data and the telematic data may be missing, partial, or complete, and either may contain errors such as erroneous data, corrupted data, duplicate data, and other such errors. Data may be incomplete due to system errors, downtime, or technical failure. Incomplete data may result in unaccounted periods of time that span days or weeks in which installed devices (such as a TCU 116) fail to record vehicle information relied on for emission calculations. The quality of the data, if not cleaned and accepted, can have a significant impact on the results of the emissions calculations and the output information 306. The data acceptance methodology 600 may reduce or prevent the impact of data errors causing flawed emissions calculation results.

The fuel card data may include, for example, the following data elements: fuel purchase amount (gallons, kWh, etc.); fuel cost; fuel type; mileage (odometer reading at current purchase minus odometer reading at previous purchase); end date odometer reading (recorded at the end of a specific period or trip); location of purchase; vehicle ID; date; time; fleet ID; and company ID. The telematic data may include, for example, the following data elements: distance traveled; odometer reading; inter-trip idle time; short idle time; parked idle time; fuel consumption; fuel consumption during idle time; fuel consumption during parked idle time; fuel tank current level; fuel type; end date odometer reading; end date odometer reading datetime; MPGEUS; kilowatt hours consumed; and vehicle ID. There may be more or fewer data elements in either or both sets of data. Each data element may contain one or more values. For example, data elements may have values associated with a particular date and/or time, such that data collected over time can be used to determine and display trends, such as fuel consumption over time.

The data received by the system 300, e.g., the telematic data and the fuel card data, may be received with the data elements contained therein being a variety of datatypes, including, for example, strings, integers, floats, Booleans, datetimes, etc. Some of these datatypes may be undesirable for further processing, so the system 300 will perform data type conversion 602. In an example, during data type conversion 602, the system 300 may implement rules such that if the fuel card data elements: fuel purchased; fuel consumed; mileage; and location of purchase; are not integers, then the system 300 will convert them to integers. In a similar example, these fuel card data elements may be converted to floats. In an example, during data type conversion 602, the system 300 may implement rules such that if the telematic data elements: distance; odometer; idle time; fuel consumption; fuel tank; MPGEUS; and kilowatt hours; are not integers, then the system 300 will convert them to integers. In a similar example, these telematic data elements may be converted to floats. In another example, if date and time related data elements are not in the datetime datatype, they may be converted to the datetime datatype. Other datatype conversions may also occur during the data type conversion 602. During data type conversion 602, units of data values may be normalized to facilitate subsequent analysis.

After data type transformation 602, the system 300 may initiate one of the data cleaning methods 604, 606, and 608, depending on the availability of fuel card data and telematic data. If fuel card data is available and telematic data is not available, then the system 300 will initiate cleaning fuel card (FC) data 604. If telematic data is available and fuel card data is not available, then the system 300 will initiate cleaning telematic data 606. If both fuel card data and telematic data are available (at least in part), then the system 300 will initiate cleaning telematic & fuel card data 608.

While cleaning FC data 604, the system 300 may test, for example and without limitation, the fuel purchase amount and mileage data elements against a set of parameters. Those parameters may be, for example: upper and lower bounds (which may be based upon industry average ranges, physical limitations, etc.); duplicate value (e.g., a copy or partial record of the same value is recorded in the same index, or two attributes contain the same values in the same index); lexical errors (which may be tested for by identifying a sequence of characters that does not match the pattern of any token, including, e.g., exceeding the length of numeric constants or identifiers, the presence of illegal characters, or spelling error); cryptic errors (e.g., error codes that offer no useful information); and embedded values (values contained within or associated with other data attributes). If the system 300 determines that the values within the data elements fail against the tested parameters (e.g., the data value is not physically possible, or the data value is determined to be a duplicate), then the system 300 may remove those values and/or data elements. As an example, a driver 208 may manually enter an odometer value into the FCS 200, but make an error while doing so, resulting in a mileage calculation that is impossible, e.g., negative. Removing such erroneous numbers is necessary to avoid emissions calculations that are inaccurate.

While cleaning telematic data 606, the system 300 may test, for example and without limitation, the fuel consumption, distance, idle time, idle time fuel consumption, parked idle time fuel consumption, and MPGEUS data elements against a set of parameters. Those parameters may be, for example: upper and lower bounds (which may be based upon industry average ranges, physical limitations, etc.); duplicate value (e.g., a copy or partial record of the same value is recorded in the same index, or two attributes contain the same values in the same index); lexical errors (which may be tested for by identifying a sequence of characters that does not match the pattern of any token, including, e.g., exceeding the length of numeric constants or identifiers, the presence of illegal characters, or spelling error); cryptic errors (e.g., error codes that offer no useful information); and embedded values (values contained within or associated with other data attributes). If the system 300 determines that the values within the data elements fail against the tested parameters (e.g. the data value is not physically possible, or the data value is determined to be a duplicate), then the system 300 may remove those values and/or data elements.

While cleaning telematic and FC data 608, the system 300 may implement both cleaning FC data 604 and cleaning telematic data 606 in combination.

Following the data cleaning methods 604, 606 or 608, the system 300 may initiate one of the data acceptance methods 610, 612, and 614, depending on the availability of fuel card data and telematic data. If fuel card data is available and telematic data is not available, then the system 300 will initiate accepting FC values 610. If telematic data is available and fuel card data is not available, then the system 300 will initiate accepting telematic values 612. If both fuel card data and telematic data are available (at least in part), then the system 300 will initiate accepting telematic & FC values 614.

While in the process of accepting FC values 610, the system 300 may evaluate the completeness of the cleaned FC data, and make decisions of whether to impute values or remove data elements and/or values. For example, the system 300 may evaluate whether the fuel purchase quantity data element contains more than a threshold number of null values (including values missing due to their removing during stage 604), and, if so, impute one or more fuel purchase quantity values. The imputation of values may be based on an identified data trend and interpolated, based on an average (mean, median, or mode) value, based on an industry or company standard value, etc. In another example, the system 300 may evaluate whether the mileage data element contains more than a threshold number of null values, and, if so, remove the mileage data element and use only fuel purchase quantity data for emissions calculations.

While in the process of accepting telematic values 612, the system 300 may evaluate the completeness of the cleaned telematic data and make decisions of whether to impute values or remove data elements and/or values. For example, the system 300 may evaluate whether the fuel consumption data element contains for than a threshold number of null values, and, if so, impute one or more fuel consumption values. The imputation of values may be based on an identified data trend and interpolated, based on an average (mean, median, or mode) value, based on an industry or company standard value, etc. In another example, the system 300 may evaluate whether the distance traveled data element contains more than a threshold number of null values, and if so, may instead determine distance based on odometer values (i.e. subtracting the earliest odometer reading within the relevant timeframe from the latest odometer reading within the relevant timeframe), or may remove the distance data element and use only fuel consumption data for emissions calculations. In an example, a TCU 116 may record a distance traveled value that is physically impossible, such as 80,000 miles in one day. Removing such erroneous numbers is necessary to avoid emissions calculations that are inaccurate.

While in the process of accepting telematic and FC values 614, the system 300 may evaluate the completeness of the cleaned telematic data and cleaned FC data, and make decisions of whether to use one data source over another, to impute values, or remove data elements and/or values. For example, the system 300 may evaluate whether the fuel consumption data element (from the telematic data) contains more than a threshold number of null values, and if so, may substitute fuel purchase data from the fuel card data, if the fuel purchase data is available. If fuel purchase data is not available, or if substituting fuel purchase data will not reduce the number of null values below the threshold, then the fuel consumption data may be imputed. The imputation of values may be based on an identified data trend and interpolated, based on an average (mean, median, or mode) value, based on an industry or company standard value, based on a regression, etc. In another example, the system 300 may evaluate whether the distance data element contains more than a threshold number of null values. If so, the system 300 may determine distance based on odometer values (i.e. subtracting the earliest odometer reading within the relevant timeframe from the latest odometer reading within the relevant timeframe), if available, or the system 300 may substitute mileage data from the fuel card data, if the mileage data is available. If the distance data, odometer data, and mileage data are all unavailable or incomplete, such that substitution would not reduce the number of null values below the threshold number, then the system 300 may remove the distance data element and use only fuel consumption and/or fuel purchase data for emissions calculations. During the process of accepting telematic and FC values 614, the system 300 may use either telematics data 302 or fuel card data 304 as the primary (default) data source, and only supplement from the other data source when there are sufficient null values present. However, some calculations may require a data element that is only sourced from one of the data sources, such as Cost of Carbon, which requires fuel cost information. The system 300 may also cross-validate the telematic data with the fuel card data, using the one data source to help identify outlier values in the other. For example, if trend is established by the data provided by one data source, with the exception of a data point that breaks from the trend without being obviously erroneous, the system 300 may compare the outlier data point with a comparable data point taken from the other data source. If the comparable data point conflicts with the outlier data point while matching with the identified trend, the system 300 may discard the outlier data point and substitute the comparable data point.

The threshold number of null values used in the data acceptance methods 610, 612, 614, may be any number, including 1, 2, 5, 10, 25, 50, 75, 100, 250, 500, 1000, 5000, 10,000, or more, or any number in between. The threshold number may also be a percentage of the total expected values (wherein the number of expected values is based on a timeframe of data collection), such as 1%, 2%, 5%, 10%, 25%, 30%, 33%, 50% 67%, 75%, or 90%, or any number in between. In one potential example, if, while accepting telematic values 612, the system 300 is evaluating whether the fuel consumption data contains more than a threshold number of null values, the system may evaluate whether at least 10% of the expected number of fuel consumption values are null, and if so, the system 300 may impute values in place of the null values. As a note, more data elements may be evaluated for null values than just those listed in examples above, and imputations, substitutions, and data element removals may be performed by the system 300 in response to such evaluations.

For example, if while accepting telematic and fuel card values 614, the system 300 finds, of the fuel consumption values derived from the telematics system, that more than a threshold percentage of null values exist, e.g., 20%, then the system 300 may replace the null values with fuel purchased values from the fuel card data for the same date range and vehicle(s). It is also possible that if the number of null values present exceeds another threshold, e.g., 50%, in a given time period, that the fuel card data will entirely replace the telematic data for that time period, given the high unreliability.

After performing one of the data acceptance methods 610, 612, or 614, the system 300 may initiate unit conversion 616. During unit conversion 616, the system 300 may convert units depending on the preferred output of the emission calculation 618. For example, a European customer may prefer to have emissions calculated using metric units, such as liters of fuel and kilometers of distance, while an American customer may prefer to have emissions calculated using imperial units, such as gallons of fuel and miles of distance. Units may be dictated by regulatory compliance requirements as well.

After unit conversion 616 (if necessary), or after data acceptance methods 610, 612, or 614 if unit conversion is unnecessary, the system 300 may initiate emission calculation 618. Within emission calculation 618, the system 300 may calculate scope 1 $CO_2$ emissions (CO2e) by, for example, using the GHG protocol fuel-based method of calculation. An example of this method of calculation is described below.

$$CO2e \text{ from transportation} = \sum X + Y + Z$$

where:

$$X = \sum_{Fuel\ type\ i=1}^{Fuel\ type\ n} Q_{Fuel\ i} \times E_{Fuel\ i}$$

$Q_{Fuel}$ is the quantity of fuel consumed (of fuel type i), which may, e.g., have the unit liters;

$E_{Fuel}$ is the emission factor for fuel type i, which may, e.g., have the unit kg CO2e/liter;

$$Y = \sum_{Grid\ region\ i=1}^{Grid\ region\ n} Q_{Elec\ i} \times E_{Elec\ i}$$

$Q_{Elec}$ is the quantity of electricity consumed within grid region i, which may, e.g., have the unit kWh;

$E_{Elec}$ is the emission factor for grid region i, which may, e.g., have the unit kg CO2e/kWh;

$$Z = \sum_{Refrigerant\ type\ i=1}^{Refrigerant\ type\ n} Q_{Ref\ i} \times GWP_{Ref\ i}$$

$Q_{Ref}$ is the quantity of refrigerant leakage (e.g., from one or more air conditioners) of refrigerant type i, which may, e.g., have the unit liters; and $GWP_{Ref}$ is the global warming potential for refrigerant type i, which may, e.g., have the unit kg CO2e/liter.

The system 300 may calculate allocated fuel use (AFU) using one of the following formulas. The AFU is the amount of fuel attributable to a particular customer of the vehicle 100 (or fleet of vehicles, etc.).

$$AFU = \frac{M_C}{M_{Total}}$$

where M is the mass of a particular customer's goods transported, and $M_T$ is the total mass of goods transported.

$$AFU = \frac{V_C}{V_{Total}}$$

where V is the volume of a particular customer's goods, and Vr is the volume of goods transported.

The system 300 may calculate CO2e from unladen backhaul using the following formula.

$$CO2e \text{ from backhaul} = \sum_{Fuel\ type\ i=1}^{Fuel\ type\ n} Q_{Fuel\ BH\ i} \times E_{Fuel\ i}$$

where:

$Q_{Fuel\ BH}$ is the quantity of fuel, of fuel type i, consumed from backhaul, which may, e.g., have the unit liters, and may be determined by multiplying the average fuel efficiency of the unladen vehicle 100 by the total distance traveled unladen; and $E_{Fuel}$ is the emission factor for fuel type i, which may, e.g., have the unit kg CO2e/liter.

The system 300 may calculate scope 1 CO2e from transportation using a distance-based method, instead of, or in addition to, the fuel-based method. For example, if the quantity of fuel consumed is not available, the system 300 may use the distance-based method. The distance-based method may use the following formula.

$$\text{CO2e from transportation} = \sum\nolimits_{\textit{Vehicle type } i=1}^{\textit{Vehicle type } n} Q_{Goods} \times D \times E_{Vehicle}$$

where:

$Q_{Goods}$ is the quantity of goods transported, which may, e.g., have the unit tonnes or m³; D is the distance the goods were transported (e.g., km); and $E_{Vehicle}$ is the emission factor of vehicle type i, which may, e.g., have the unit (kg CO2e/tonne/km) or (kg CO2e/m³/km).

Within emission calculation 618, the system 300 may calculate scope 1 $CH_4$ and $N_2O$ emissions by, for example, using a fuel-based method of calculation, or a distance-based method of calculation. In one method, distance is multiplied by mass or volume of goods transported and relevant emission factors that incorporate average fuel consumption, average utilization, average size and mass or volume of the goods and the vehicles, and their associated GHG emissions. The below formulas may be used:

$$CH_4 e = D \times E_{CH_4}$$

$$N_2 O e = D \times E_{N_2O}$$

where:

D is the distance traveled by the vehicle (e.g., km);
$E_{CH_4}$ is the emission factor for $CH_4$ (e.g., kg $CH_4$/km); and
$E_{N_2O}$ is the emission factor for $N_2O$ (e.g., kg $N_2O$/km).

However, if distance/mileage values were not accepted by the system a fuel-based calculation may instead be applied, or only CO2 emissions will be calculated using fuel related data. If mileage attributes were accepted and present and CH4 and N2O emissions are calculated, they must then undergo a conversion to calculate their value as a CO2 equivalent. This is a unit of measure that is used to express the global warming potential of different greenhouse gases in terms of the amount of CO2 that would have the same amount of impact over a specified period of time. For this conversion, the system utilizes Global Warming Potential values that can be multiplied to the CH4 and N2O amounts. After this conversion, the amounts of CH4, N2O, and CO2 may be added together and represented as one number in CO2e units to show total emissions. The total emissions calculation for all pollutants regardless of methodology may be combined to show total fleet emissions on the dashboard and reports. Total emissions for one vehicle, driver, etc., may also be determined and reported. Similarly, the emissions for each individual pollutant are displayed in a subsequent location on the dashboard and reported to align with the TCFD, and other, reporting guidelines.

The system 300 may also calculate scope 2 emissions. Scope 2 emissions are indirect GHG emissions associated with the purchase of electricity, steam, heat, or cooling. Still aligned with the GHG Protocol for scope 2 emission calculations, the system 300 may use location-based methodology. This method is based on average energy generation emission factors for defined geographic locations, including local, subnational, or national boundaries. Emissions are allocated within a specific geographical area and defined timeframe; emission factors capture the average emissions produced during energy generation. This method is applicable to all electricity grids. Every unit of electricity consumed must be paired with a suitable emission factor that corresponds to the location or market of the consuming facility. Mean emission factors portray the collective electricity production within a designated grid distribution region, which closely corresponds to a geographically defined energy distribution and utilization area. These factors must account for net physical energy imports and exports across the grid boundary. These emission factors convey combustion-only (direct) GHG emission rates, expressed in metric tons per MWh or kWh.

The procedure for calculating scope 2 emissions may be as follows.

1. Multiply activity data from each operation by the emission factor for that activity for each applicable GHG. Some electricity emission factor sets may include emission rates for CO2, CH4, and N2O; others may only provide CO2 emission rates.
2. Multiply global warming potential (GWP) values by the GHG emissions totals, for all gases other than CO2, to calculate total emissions in CO2 equivalent (CO2e).
3. Report final scope 2 by each method in metric tons of each GHG (where available) and in metric tons of CO2e.

The system 300 may also calculate scope 3 emissions. Scope 3 emissions are defined by the GHG Protocol as all indirect emissions (not included in scope 2) that occur in the value chain of the reporting company, including both upstream and downstream emissions. While there are fifteen categories of scope 3 emissions, the following categories may be most relevant to the trucking sector. This means while customers may still report within all fifteen categories of scope 3 emissions, the system 300's reports may prioritize data collection of the following categories.

Scope 3 Category 1: Purchased Goods and Services-Extraction, production, and transportation of goods and services purchased or acquired by the reporting company in the reporting year, not otherwise included in Categories 2-8.

Scope 3 Category 3: Fuel- and energy related activities-Extraction, production, and transportation of fuels and energy purchased or acquired by the reporting company in the reporting year, not already accounted for in scope 1 or scope 2.

Scope 3 Category 4: Upstream transportation and distribution-Transportation and distribution of products purchased by the reporting company in the reporting year between a company's tier 1 suppliers and its own operations (in vehicles and facilities not owned or controlled by the reporting company). Including inbound logistics, outbound logistics (e.g., of sold products), and transportation and distribution between a company's own facilities (in vehicles and facilities not owned or controlled by the reporting company).

Scope 3 Category 8: Upstream Leased Assets-Operation of assets leased by the reporting company (lessee) in the reporting year and not included in scope 1 and scope 2-reported by lessee.

Scope 3 Category 9: Downstream transportation and distribution-Transportation and distribution of products sold by the reporting company in the reporting year between the reporting company's operations and the end consumer (if not paid for by the reporting company), including retail and storage (in vehicles and facilities not owned or controlled by the reporting company).

Scope 3 Category 13: Downstream Leased Assets-Operation of assets owned by the reporting company (lessor) and leased to other entities in the reporting year, not included in scope 1 and scope 2-reported by lessor.

The system 300 may employ a spend-based method for calculations for all categories of scope 3 emissions. This method estimates emissions for goods and services by collecting data on the economic value of goods and services purchased and multiplying it by relevant secondary (e.g., industry average) emission factors (e.g., average emissions per monetary value of goods). The system 300 may also employ automatic data collection of any or all scope 3 categories, including categories 4, 8, 9, and 13 emissions, through supplier specific integrations.

During emission calculation 618, the system 300 may calculate emissions generated over time, total emissions, emissions attributable to various sources (e.g., particular vehicles 100, drivers 208, customers, fuel types, shipments, loads, etc.) or behaviors (e.g., hauling, unladen backhaul, idling, highway driving, city driving, etc.), emissions trends, comparisons to industry standards/benchmarks or emissions targets, industry carbon rating, emissions costs, emissions forecasts, emission reduction recommendations, emissions progress tracking, scope 1/2/3 emissions analysis, and more. The system 300 may generate reports and data visualizations based on data and insights calculated during emission calculation 618, and/or data resulting from data acceptance methods 610, 612, and 614, including after unit conversion 616 if necessary. Reports and data visualizations may show current emissions, historical emissions, predicted future emissions, and emissions generated over a customizable time window. Some calculations, reports, and data visualizations may rely on telematic data 302, FC data 304, or both telematic data 302 and FC data 304. For example, a cost of carbon calculation would require FC data, because fuel purchase data (including total amount spent on fuel) can only be collected by the Fuel Card system 200.

Reports may include qualitative and quantitative sections related to emissions and/or overall climate impact. Qualitative sections can be guided by topics, requirements, or policy that requires the user to share information on several impact areas including but not limited to: board-level oversight on climate related issues, the adoption of a scientific emission reduction target, regions operations were conducted, reporting boundaries, inherent climate-related risks with the potential to have a substantive financial impact to the company, etc. These sections such as risks and opportunities, targets and reduction, biodiversity, etc. serve to provide a deeper background on the company's overall climate impact and their plans to reduce future emissions. Quantitative sections of the reports contain data that is automatically calculated and generated from the system 300, mainly to report on current GHG emissions or emissions for a particular time period i.e., reporting year. This section can include but is not limited to scope 1, scope 2, scope 3 emissions, emission amounts of each GHG, total energy usage (KWh/MWH), total emission footprint (aggregation of all three scopes), industry carbon rating based upon emissions performance compared to industry peers, average emissions per vehicle, idle-time emissions, total fuel consumed, impact of sustainable solutions integrated-ex. Month over month increase or decrease in emissions from the date of integrating an EV, emission reduction target, forecasted emissions, etc.

Data visualizations and/or reports may further include Sustainable Solution Markers (SSMs). The SSMs may mark a date that a particular change (e.g., an initiative or solution) was implemented by a customer (fleet manager, company, etc.), and allow recording of the details of the change. This may enable a customer to monitor the impact of particular changes over time, and to make decisions based on empirical data. Reports may highlight the effectiveness of certain changes and recommend adjustments for continuous improvement.

The system 300 may generate emissions forecasts using a forecasting tool, such as Prophet. The system 300 may primarily use two models, Bayesian and Monte Carlo. Through Bayesian approach, the model forecasts data points in the future. Bayesian uses the provided historical dataset to discover trends or patterns to make future predictions. Monte Carlo explores different possible future scenarios, which enables insight into the variability and of the predictions. The system 300 may determine an upper bound, a lower bound, and a predicted value for emissions forecasts. Upper bound (a.k.a y-hat upper) is the upper uncertainty or upper limit of the forecasted values. It indicates the possible maximum value the time-series/forecast is expected to reach with a certain level of confidence. It is often associated with the upper 95% quantile of the forecast distribution meaning that there is a 95% chance that the actual value will fall below this upper bound. (Monte-Carlo). Lower bound (a.k.a. y-hat lower) is the lower uncertainty/limit of the forecasted values. Similar to y-hat upper, it represents the lower possible minimum value the forecast expected to reach. It is associated with the lower 5% quantile meaning that the model is 95% confident that the actual value will above this lower bound (Monte-Carlo). The predicted value (y-hat) represents the predicted value for a given time series data point. It is the midpoint of the prediction interval and is considered the most likely value for the forecast. (Bayesian).

The system 300 may generate emissions reduction recommendations based on telematic data, fuel card data, and/or emission calculations. The system 300 may do so by identifying which data elements have the greatest impact on a vehicle 100's (or fleet's, driver's, etc.) emissions. The system may also compare telematic data, fuel card data, and/or emission calculations to industry standards or targets. For example, if a vehicle 100 has idle time data is that significantly above the industry standard, the system 300 may identify this problem, highlight it to the end user, and generate a recommendation to implement an idle time policy for drivers 208. In another example, the system 300 may analyze GPS data, distance data, and fuel consumption data to determine route optimization, and generate a recommendation to optimize route selection for fuel efficiency, such as avoiding low-speed roads and intersections.

Figure 7:
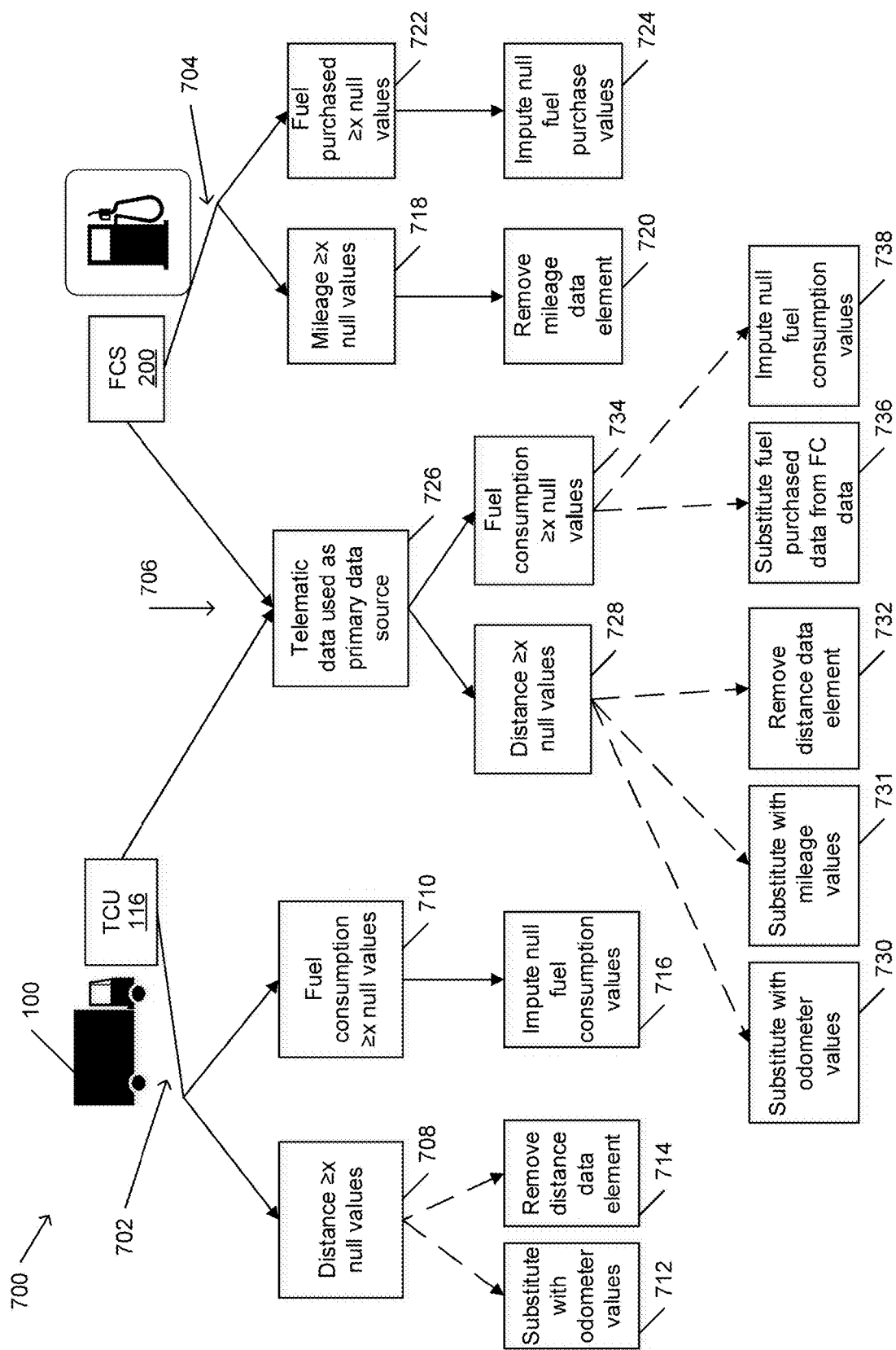
FIG. 7 is an example of a logic flow diagram.

FIG. 7 shows an example diagram of a logic flow 700 that may be executed by the system 300. The logic flow 700 may occur within the data processing stage 410, and within the data acceptance stages 610, 612, and 614, within data flow 600. The logic flow 700 may comprise three primary logic pathways, the telematic logic pathway 702, the FC logic pathway 704, and the combined logic pathway 706.

The telematic logic pathway 702 may be followed by the system 300 when the system 300 has access to telematic data 302 from the TCU 116 (e.g., via a fleet management software API), but does not have access to the FC data 304 from the FC system 200. Within the telematic logic pathway 702, the system 300 may determine whether the distance data element contains more than a threshold number of null values, at stage 708. If the distance data element does contain more than a threshold number of null values and there are odometer values available, then the system may choose to proceed to stage 712, where the system 300 will substitute distance values with odometer values (for example, if the distance data element is not available, the system may default to using the max and min odometer readings). If the distance data element does contain more than a threshold number of null values and there are not sufficient odometer values available to render the distance data element complete, then the system 300 may proceed to stage 714, where the system 300 will remove the distance data element, and rely only on the fuel consumption data element for emission calculations. Also within the telematic logic pathway 702, the system 300 may determine whether the fuel consumption data element contains more than a threshold number of null values, at stage 710. If the fuel consumption data element does contain more than a threshold number of null values, then the system 300 may proceed to stage 716, where the system 300 will impute the missing (i.e., null) consumption values.

The FC logic pathway 704 may be followed by the system 300 when the system 300 has access to FC data 304 from the FC system 200, but does not have access to the telematic data 302 from the TCU 116. Within the FC logic pathway 704, the system 300 may determine whether the mileage data element contains more than a threshold number of null values, at stage 718. If the mileage data element does contain more than a threshold number of null values, then the system 300 may proceed to stage 720, where the system 300 will remove the mileage data element, and rely only on the fuel purchase data element for emission calculations. Also within the FC logic pathway 704, the system 300 may determine whether the fuel purchase data element contains more than a threshold number of null values, at stage 722. If the fuel purchase data element does contain more than a threshold number of null values, then the system 300 may proceed to stage 724, where the system 300 will impute the missing fuel purchase values.

The combined logic pathway 706 may be followed by the system 300 when the system 300 has access to both telematic data 302 and FC data 304, at least in part. Within the combined logic pathway 706, the system 300 may use the telematic data 302 as the primary data for emission calculations, as shown in stage 726. However, as a note, there may be some calculations that rely on FC data 304, such as cost of carbon. The system may, in some instances where telematic data 302 and FC data 304 have overlapping data, create an average of values between the telematic data values and fuel card data values, and use the average values for emission calculations 618.

At stage 728, the system 300 may determine whether the distance data element contains more than a threshold number of null values, at stage 728. If the distance data element does contain more than a threshold number of null values and there are odometer values available, then the system may choose to proceed to stage 730, where the system 300 will substitute distance values with odometer values. If the distance data element does contain more than a threshold number of null values and there are not sufficient odometer values available to render the distance data element complete, then the system 300 may proceed to stage 731, where the system 300 will substitute distance values with mileage values (from the FCS 200). If the distance data element does contain more than a threshold number of null values and there are not sufficient odometer values or mileage values available to render the distance data element complete, the system 300 may proceed to stage 732, where the system 300 will remove the distance data element, and rely only on the fuel consumption data element for emission calculations.

At stage 734, the system 300 may determine whether the fuel consumption data element contains more than a threshold number of null values. If the fuel consumption data element does contain more than a threshold number of null values, then the system 300 may proceed to stage 736, where the system 300 will substitute fuel purchase values from the FC data 304 for some or all of the fuel consumption values, if such fuel purchase values are available. If the fuel consumption data element does contain more than a threshold number of null values, and there is not sufficient fuel purchase data to complete emission calculations, then the system 300 may proceed to stage 738, where the system 300 will impute fuel consumption values in place of the null fuel consumption values.

Figure 8:
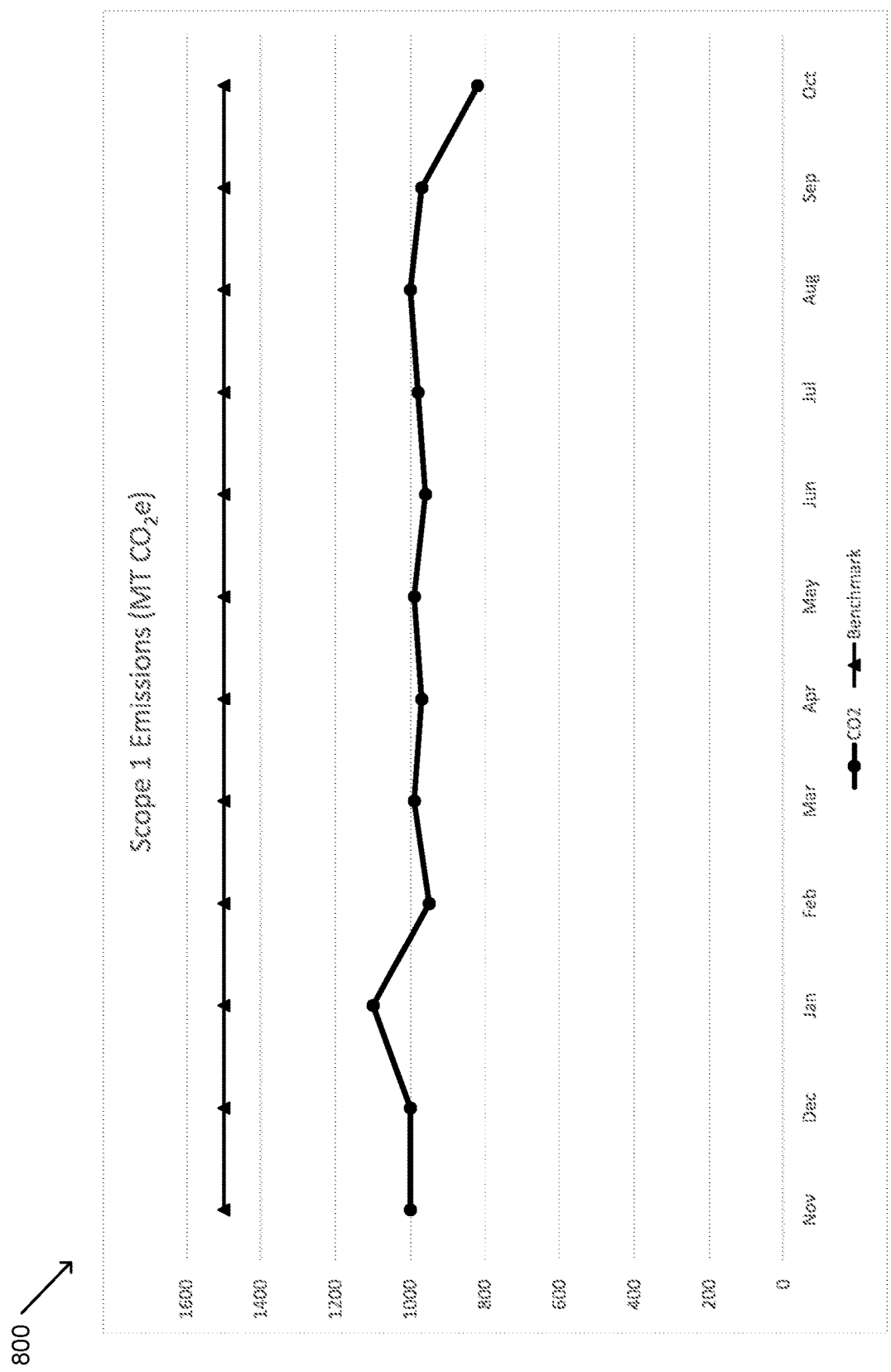
FIG. 8 is an example of an emissions data visualization chart.

FIG. 8 shows an example data visualization chart 800 of scope 1 emissions over time of a fleet of vehicles 100. This data visualization chart 800, and all data visualizations, may be accessible on a user device 308 by interacting with a user interface on, for example, an app or web application that can make requests to the API gateway server 414. In this example, a user may access this data visualization by selecting a historical scope 1 emissions chart for a timeframe of 1 year (November through October). The chart 800 may show the monthly totals of scope 1 emissions (in MT CO2e) generated by vehicles associated with the user over the course of 1 year, shown here in light grey. The chart 800 may also show an industry benchmark of monthly emissions, which in this case is 1500 MT CO2e, as shown in dark grey. The benchmark may be derived from Government data or data from verified third-party organizations, or data from other users within the platform. Using this chart 800, the user can observe trends in vehicle emissions and make comparisons to the industry benchmark. In other examples not shown, users can also view scope 2 or scope 3 data visualizations, various combinations of scope 1, scope 2 and scope 3 emissions, emissions associated with particular vehicles, drivers, or groups of vehicles or drivers, emissions associated with particular customers of the user, and visualizations of other analytics capable of being generated using the available data.

Figure 9:
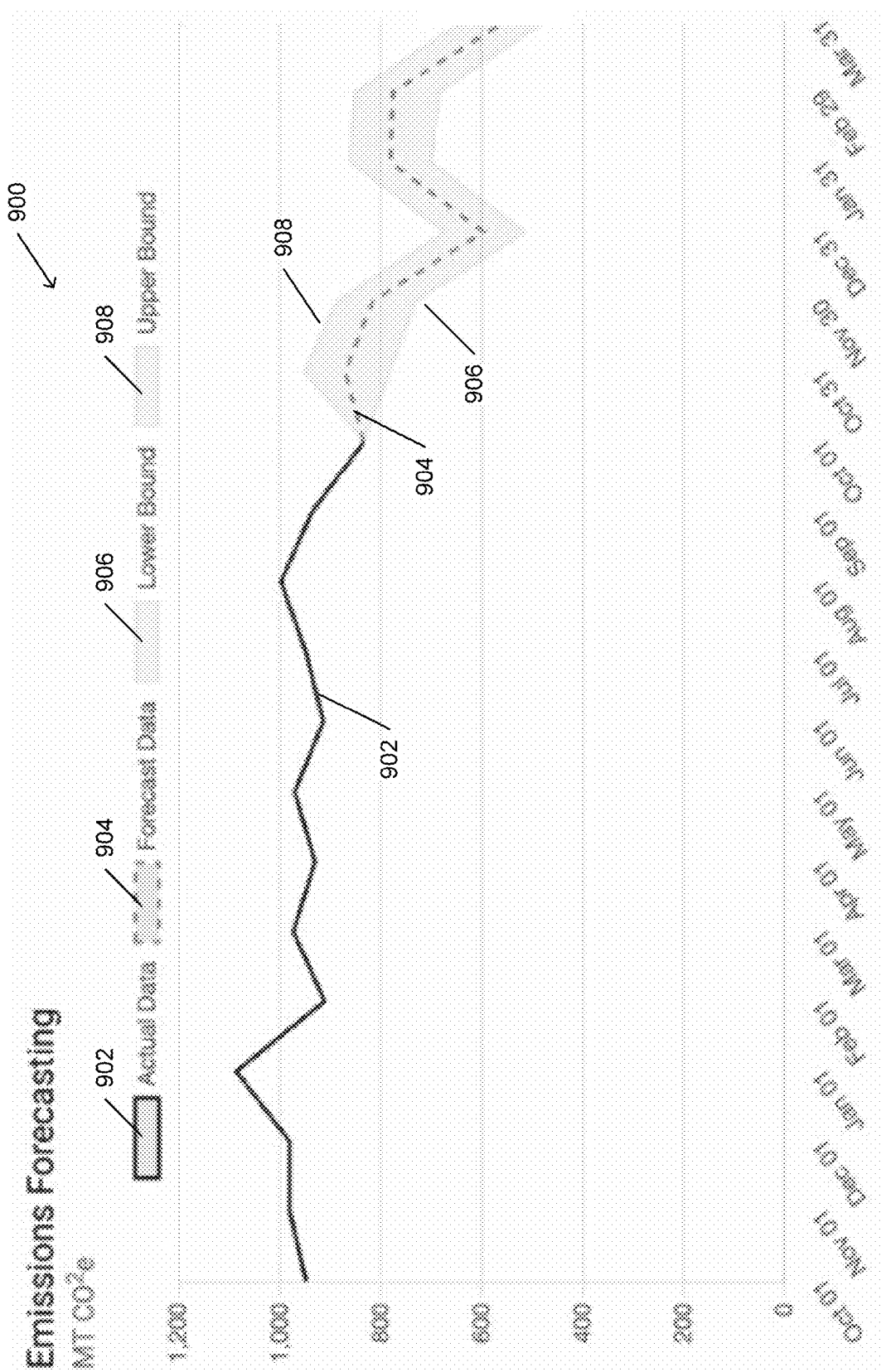
FIG. 9 is an example of an emissions forecasting chart.

FIG. 9 shows an example emissions forecasting chart 900. The emissions forecasting chart 900 may be generated based on the emissions forecasting calculations done as part of emission calculation 618. The emissions forecasting chart 900 may comprise some quantity of actual data 902, such as the emissions data for a period of time (e.g., 1 year) up to the current date. The emissions forecasting chart 900 may also comprise forecast data 904, which is the expected quantity of future emissions (calculated using the Bayesian method), in this case, plotted over time. In addition to the forecast data 904, the emissions forecasting chart 900 may display a lower bound 906 and upper bound 908 of the expected quantity of future emissions (calculated using the Monte Carlo method). In an example, the lower and upper bounds may be determined by being the emissions values above and below (respectively) which the future emissions falls in 95% of the future scenarios.

Figure 10:
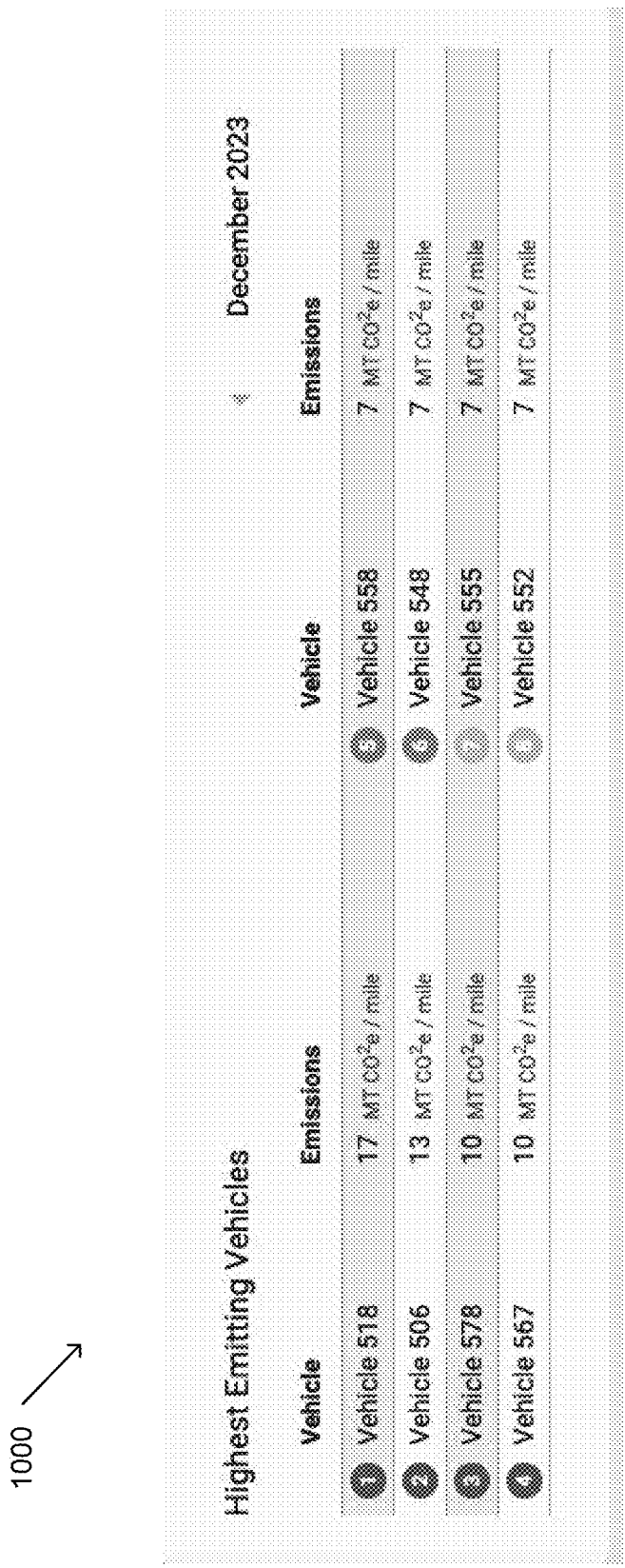
FIG. 10 is an example of a visualization of a list of highest emitting vehicles.

FIG. 10 shows an example individual vehicle emissions chart 1000. The individual vehicle emissions chart 1000 depicts the highest emitting vehicles within a fleet. Using unique vehicle ID's from a fuel card system and/or a telematics system, users can view their highest emitting vehicles, and the amount of $CO_2$ they emit over specified time periods, and, for example, $CO_2e$ per mile (as shown).

Figure 11:
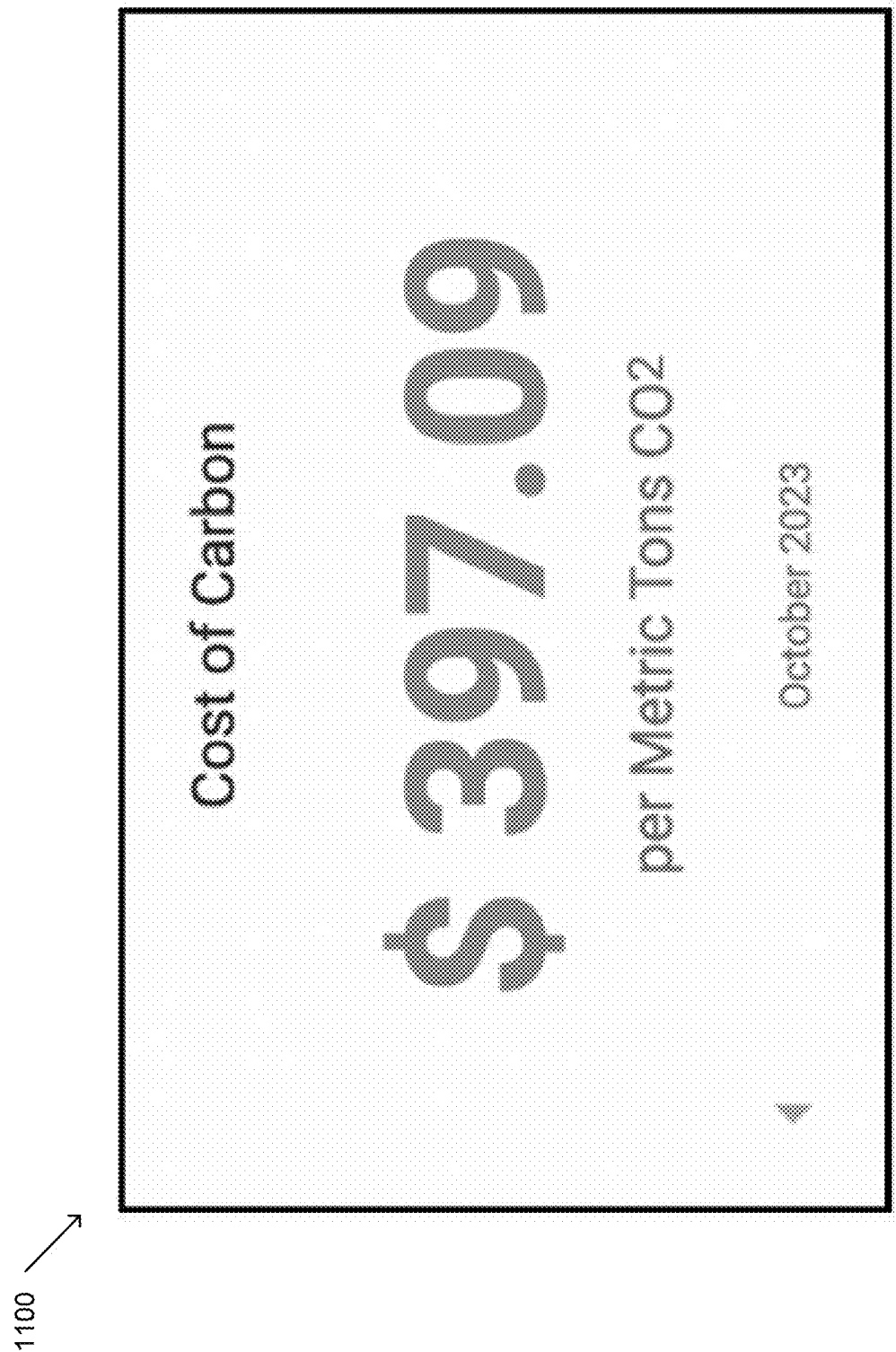
FIG. 11 is an example of a visualization of a cost of carbon calculation.

FIG. 11 shows an example cost of carbon visualization 1100, which depicts the cost associated with each metric ton of $CO_2$ emitted from a user's vehicle(s). The cost is calculated by dividing the total amount of $CO_2$ emissions for a given timeframe by the total spend on fuel purchases in that timeframe (derived from fuel card data). Through leveraging financial transaction data to either calculate emissions or provide financial costs associated with a user's carbon footprint, the emissions cloud platform can identify areas of cost-savings, emission reduction, and more.

Various embodiments of the described methods and systems may be characterized by the potential claims listed in the paragraphs following this paragraph (and before the actual claims provided at the end of this application). These potential claims form a part of the written description of this application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public.

The embodiments described above are intended to be merely exemplary; numerous variations and modifications will be apparent to those skilled in the art. All such variations and modifications are intended to be within the scope of the methods and systems as defined in any appended claims.

What is claimed is:

1. A method for monitoring emissions for a fleet of vehicles, comprising:
   receiving both vehicle telematics data and fuel purchase data for each vehicle of the fleet of vehicles;
   formatting the vehicle telematics data and the fuel purchase data in alignment with a data structure schema;
   storing the vehicle telematics data and the fuel purchase data in an electronic data structure;
   determining, using one of the vehicle telematics data or the fuel purchase data, a primary data source, and using one of an emissions consumption method or a distance method of calculating emissions, a primary method, that the primary data source contains insufficient information to determine an amount of emissions generated by the fleet of vehicles over a particular period of time by identifying an amount of null primary source data points above a first threshold amount;
   in response to determining that the primary data source using the primary method contains insufficient information to determine the amount of emissions generated by the fleet of vehicles over the particular period of time, determining that the primary data source, using the other of the emissions consumption method or the distance method of calculating emissions, a secondary method, also contains insufficient information to determine the amount of emissions generated by the fleet of vehicles over the particular period of time by identifying an amount of null primary source data points above a second threshold amount;
   in response to determining that the primary data source, using the secondary method also contains insufficient information to determine the amount of emissions generated by the fleet of vehicles over the particular period of time, determining using the secondary data source, and using the primary method of calculating emissions to determine the amount of emissions generated by the fleet of vehicles over the particular period of time also contains insufficient information to determine the amount of emissions generated by the fleet of vehicles over the particular period of time by identifying an amount of null secondary data points above a third threshold amount;
   in response to determining that the secondary data source, using the primary method also contains insufficient information to determine an amount of emissions generated by the fleet of vehicles over the particular period of time, determining using the secondary data source, and using the secondary method of calculating emissions to determine an amount of emissions generated by the fleet of vehicles over a particular period of time also contains insufficient information to determine an amount of emissions generated by the fleet of vehicles over the particular period of time by identifying an amount of null secondary data points above a fourth threshold amount;
   imputing an amount of filler data points in place of the null secondary data points such that the null secondary data points are below the fourth threshold amount, and determining the amount of emissions generated by the fleet of vehicles over the particular period of time based on the secondary data source including the imputed filler data points; wherein the filler data points are at least one of: interpolated data points;
   extrapolated data points; selected based on an average value, and selected based on a standard value;
   determining one or more factors affecting the amount of emissions generated by the fleet of vehicles over the particular period of time based on the secondary data source, the secondary method, and the emissions generated by the fleet of vehicles;
   recommending one or more changes to make to reduce future emissions generated by the fleet of vehicles; and
   causing, based on the recommendation, a reduction in emissions by the fleet of vehicles via one or more of an equipment change, process change, personnel change, behavior change, or routing change.

2. The method of claim 1, wherein the primary data source comprises the vehicle telematics data and the secondary data source comprises the fuel purchase data.

3. The method of claim 1, wherein the primary method of calculating emissions comprises the distance method and the secondary method comprises the emissions consumption method.

4. The method of claim 3, wherein the distance method is the primary method and when there is insufficient distance data, one or both of odometer data or mileage data is assessed for use in calculating emissions.

5. The method of claim 1, wherein the vehicle telematics data comprises one or more of the data elements: distance traveled; odometer reading; idle time; and fuel consumption; and wherein the fuel purchase data comprises one or more of the data elements: fuel purchase amount; fuel type; fuel cost; location of purchase; mileage, and date of purchase.

6. The method of claim 1, wherein at least one of the vehicle telematics data and the fuel purchase data is received from a fleet management system or a fuel card system.

7. The method of claim 1, further comprising generating an emissions forecast based at least in part on a trend derived from historical data of vehicle emissions.

8. The method of claim 1, further comprising calculating scope 1, 2, and 3 emissions associated with the fleet of vehicles.

9. The method of claim 1, wherein determining the emissions generated by the vehicles over a particular period of time includes determining quantities of a plurality of different greenhouse gases emitted.

10. The method of claim 1, wherein determining the emissions generated by the vehicles over a particular period of time includes allocating emissions to at least one of: one or more shippers; and one or more shipments.

11. A computer system for monitoring emissions for a fleet of vehicles, comprising:
at least one processor and at least one memory, wherein the at least one memory stores instructions that, when executed by the at least one processor, cause the computer system to:
receive both vehicle telematics data and fuel purchase data for each vehicle of the fleet of vehicles;
format the vehicle telematics data and the fuel purchase data in alignment with a data structure schema;
store the vehicle telematics data and the fuel purchase data in an electronic data structure;
determine, using one of the vehicle telematics data or the fuel purchase data, a primary data source, and using one of an emissions consumption method or a distance method of calculating emissions, a primary method, that the primary data source contains insufficient information to determine an amount of emissions generated by the fleet of vehicles over a particular period of time by identifying an amount of null primary source data points above a first threshold amount;
in response to determining that the primary data source using the primary method contains insufficient information to determine the amount of emissions generated by the fleet of vehicles over the particular period of time, determine that the primary data source, using the other of the emissions consumption method or the distance method of calculating emissions, a secondary method, also contains insufficient information to determine the amount of emissions generated by the fleet of vehicles over the particular period of time by identifying an amount of null primary source data points above a second threshold amount;
in response to determining that the primary data source, using the secondary method also contains insufficient information to determine the amount of emissions generated by the fleet of vehicles over the particular period of time, determine using the secondary data source, and using the primary method of calculating emissions to determine the amount of emissions generated by the fleet of vehicles over the particular period of time also contains insufficient information to determine the amount of emissions generated by the fleet of vehicles over the particular period of time by identifying an amount of null secondary data points above a third threshold amount;
in response to determining that the secondary data source, using the primary method also contains insufficient information to determine an amount of emissions generated by the fleet of vehicles over the particular period of time, determine using the secondary data source, and using the secondary method of calculating emissions to determine an amount of emissions generated by the fleet of vehicles over a particular period of time also contains insufficient information to determine an amount of emissions generated by the fleet of vehicles over the particular period of time by identifying an amount of null secondary data points above a fourth threshold amount;
imput an amount of filler data points in place of the null secondary data points such that the null secondary data points are below the fourth threshold amount, and determine the amount of emissions generated by the fleet of vehicles over the particular period of time based on the secondary data source including the imputed filler data points; wherein the filler data points are at least one of: interpolated data points; extrapolated data points; selected based on an average value, and selected based on a standard value;
determine one or more factors affecting the amount of emissions generated by the fleet of vehicles over the particular period of time based on the secondary data source, the secondary method, and the emissions generated by the fleet of vehicles;
recommend one or more changes to make to reduce future emissions generated by the fleet of vehicles; and
cause, based on the recommendation, a reduction in emissions by the fleet of vehicles via one or more of an equipment change, process change, personnel change, behavior change, or routing change.

12. The computer system of claim 11, wherein the primary data source comprises the vehicle telematics data and the secondary data source comprises the fuel purchase data.

13. The computer system of claim 11, wherein the primary method of calculating emissions comprises the distance method and the secondary method comprises the emissions consumption method.

14. The computer system of claim 13, wherein the distance method is the primary method and when there is insufficient distance data, one or both of odometer data or mileage data is assessed for use in calculating emissions.

15. The computer system of 11, wherein the vehicle telematics data comprises one or more of the data elements: distance traveled; odometer reading; idle time; and fuel consumption; and wherein the fuel purchase data comprises one or more of the data elements: fuel purchase amount; fuel type; fuel cost; location of purchase; mileage, and date of purchase.

16. The computer system of 11, wherein at least one of the vehicle telematics data and the fuel purchase data is received from a fleet management system or a fuel card system.

17. The method of claim 2, further comprising generating an emissions forecast based at least in part on a trend derived from historical data of vehicle emissions.

18. The computer system of claim 11, further configured to calculate scope 1, 2, and 3 emissions associated with the fleet of vehicles.

19. The computer system of claim 11, further configured to determine quantities of a plurality of different greenhouse gases emitted.

20. The computer system of claim 11, further configured to allocate emissions to at least one of: one or more shippers; and one or more shipments.

* * * * *